April 26, 1966    J. V. JOHNSTON    3,247,725
SYMMETRICAL COMPLIANCE AIR BEARING GYRO
Filed July 22, 1964

James V. Johnston
*INVENTOR.*

3,247,725
SYMMETRICAL COMPLIANCE AIR BEARING GYRO

James V. Johnston, Huntsville, Ala., assignor to the United States of America as represented by the Secretary of the Army
Filed July 22, 1964, Ser. No. 384,560
10 Claims. (Cl. 74—5)

The invention described herein may be manufactured and used by or for the Government for governmental purposes without the payment of any royalty thereon.

This invention relates to gyros and more particularly to an air bearing for providing single-degree-of-freedom gyros with substantially equal compliance in both the longitudinal and radial planes.

A single-degree-of-freedom gyro is usually comprised of a heavy wheel or disc shaped rotor mounted to spin rapidly about a single spin axis but is provided with a gimbal rotational axis 90 degrees to the spin axis. The spinning gyro offers considerable resistance, depending upon the angular momentum of the device and the friction in the gimbal axis, to any torque which would tend to change the position of the axis of spin.

Gyros are often used to maintain a fixed position in space which is independent of the bases upon which they are mounted. However, in practice all gyros have position drifts due to various torques imparted to the rotor. For example, under vibration, as experienced in missiles, an air bearing gyro support will displace further in one axis than the other. This unequal displacement of the gyro support is a major contributor to gyro drift in air bearing gyros.

One basic air bearing gyro includes a rotor carried in a floated cylinder which is mounted in a housing secured to a missile frame. The floated cylinder requires a cylindrical shape supported by air orifices around the circumference of the cylinder. Flat end plates are then required to constrain the cylinder along its longitudinal axis. However, due to the differences in area between the end plates and cylinder walls, the load carrying capability of the air bearing varies in both the longitudinal and radial planes, thus resulting in unequal compliance of the gyro in the longitudinal and radial planes.

It is an object of the present invention, therefore, to provide a single-degree-of-freedom gyro having substantially equal compliance in both the longitudinal and radial planes thereof.

A further object of the present invention is to provide a gyro with an air floated cylinder which is simultaneously supported in both axial and radial directions by common air supplying orifices.

These and other objects of the present invention are attained by the provision in a gyro device of a housing and a floated cylinder having surfaces respectively disposed in adjacent substantially parallel relationship. The floated cylinder includes a pair of peripheral surfaces inclined at 45° to the axial and radial planes thereof and the housing for the floated cylinder includes internal bearing surfaces disposed in parallel relationship with the floated cylinder surfaces and spaced therefrom to provide a cavity between the surfaces of the cylinder and housing into which a supply of air is injected. The air orifices are disposed in normal relation to the inclined internal surfaces of the housing to provide an air bearing surface disposed at 45° to the axial and radial planes of the output air bearing axis.

My invention will be more fully understood by reference to the following detailed description taken in conjunction with the accompanying drawings in which.

Figure 1:
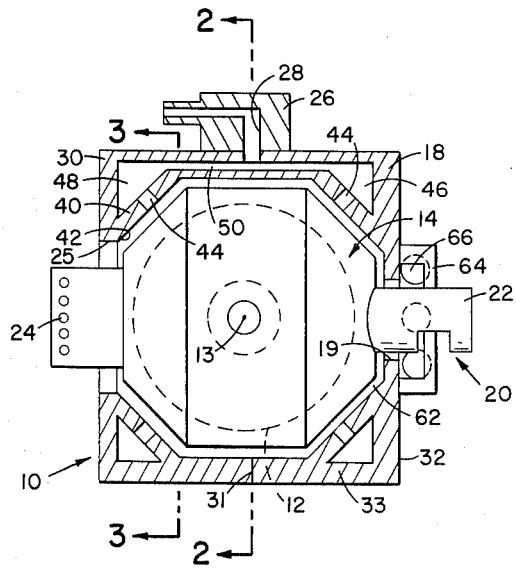
FIGURE 1 is an elevational view partially in section, of the gyro device of the present invention.
Figure 2:
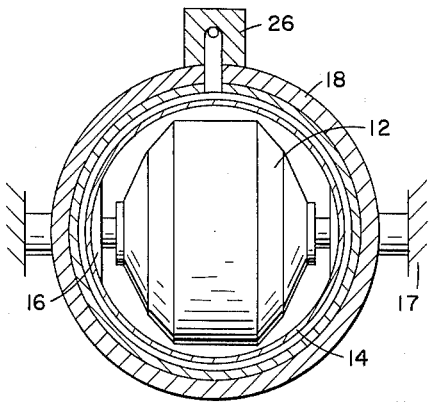
FIGURE 2 is a sectional view taken along line 2—2 of FIGURE 1.

With reference to the drawings, the invention comprises a gyro assembly 10 including a gyroscope rotor 12 mounted for rotation about its spin axis 13 within hermetically sealed inner casing 14 by means of bracket 16. Casing 14 is supported by air pressure in a housing 18 secured to a frame 17. The rotor of the gyro is run by an electric motor which receives current through slip rings 20, that is connected to a source of power through a plug 15 secured to housing 18. The slip rings make contact through neck 22 which is secured to casing 14 and protrudes through an opening 19 in housing 18. Casing 14 is further provided with a portion 24 which extends through an opening 25 in housing 18 and is disposed for receiving balancing screws to balance the output axis of the casing.

As further shown in FIGURE 1, the housing includes an extended portion 26 having an aperture 28 therein for communication with a source of air under pressure (not shown). The housing is provided with an external cylindrical configuration including left and right members 30 and 32, respectively. These members are joined at the center of the cylinder indicated at 31 to form the housing.

Figure 3:
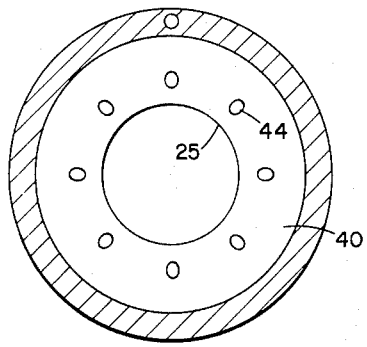
FIGURE 3 is a sectional view along line 3—3 of FIGURE 1.

As shown in FIGURES 1 and 3, both left member 30 and right member 32 includes an outer wall 33 and an internal inclined portion 40 which is disposed at a 45° angle with wall 33 and forms the bearing surface 42 for rotatable casing 14, as will be discussed hereinafter. A plurality of orifices 44 is provided in inclined portion 40 and extends perpendicularly therethrough in communication with bearing surface 42. Orifices 44 also communicate with a pair of continuous air manifolds 46 and 48 which is provided intermediate with wall 33 and portion 40 of housing 18. A connecting passage 50 connects manifolds 46 and 48 with aperture 28 to receive the source of pressurized air.

Figure 4:
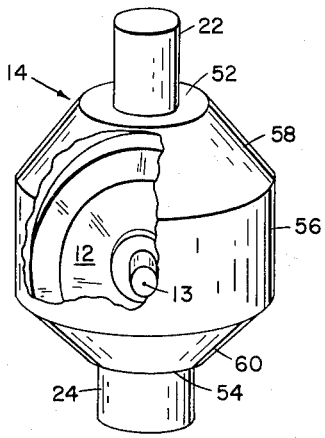
FIGURE 4 is a perspective view of the floated inner casing of the gyro device and is partially cut away to show the rotor mounted therein.
Figure 5:
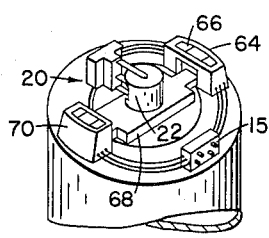
FIGURE 5 is a perspective end view of the gyro assembly illustrating the energizing and pick-up means.

As shown in FIGURE 4, casing 14 is provided with a substantially spheroid configuration having a pair of parallel annular flat surfaces 52 and 54, respectively, a central cylindrical surface 56 and a pair of surfaces 58 and 60 inclined at 45 degrees respectively with surfaces 52 and 54. As shown in FIGURE 1, casing 14 is positioned in housing 18 with the inclined surfaces 58 and 60 disposed adjacent bearing surface 42 of members 30 and 32. A cavity 62 is formed between bearing surface 42 and casing 14.

The rotor of the present invention is a standard gyro rotor such as the ones disclosed in Patents 2,925,736 and 2,926,530 and may be energized in a manner that will allow the rotor to spin at high speed. The casing 14 is allowed to have a degree of freedom about its cylindrical axis 61 of a nominal amount, usually ±5°.

For the purpose of determining the angular displacement of inner casing 14 with respect to housing 18, an inductive pickup 64, consisting of differential transformer coils 66 mounted on housing 18 and a movable copper plate 68 attached to casing 14. Any deviation of the copper plate from its null position, due to rotation of casing 14, causes the pickup 64 to generate an electrical signal. If desired this electrical signal may be utilized to energize a torquer 70, such as an induction motor having plate 68 as its armature, so as to return casing 14 to the null position. Both the torquer and the pickup are standard items and their operation and construction is fully described in Patent 2,926,530.

In operation, the source of pressurized air is supplied through aperture 28 into connecting passage 50 and then into air manifolds 46 and 48 and thence into cavity 62 to support casing 14 thereon and prevent contact of the casing with the housing. Air is allowed to escape through openings 19 and 25 of the housing.

It will be noted that each orifice equally supports the casing in both the axial and radial directions, thus permitting equal compliance in both directions. Furthermore, the present invention produces a more sensitive and efficient gyro since the mechanical gain of the gyro is improved by improving the ratio of the moment of inertia of the gyro rotor to the moment of inertia of the floated casing which supports the rotor. The moment of inertia of the floated gimbal is reduced since the weight is reduced.

It is to be understood that the invention comprehends various obvious changes in the embodiment herein illustrated, within the scope of the appended claims.

I claim:
1. A gyroscopic assembly comprising:
 (a) a cylindrical housing;
 (b) bearing surfaces disposed in said housing and inclined at a 45° angle with the longitudinal axis of said housing;
 (c) a casing having a rotor mounted therein for rotation about a first axis, said casing mounted in said housing for rotational movement about a second axis and provided with bearing surfaces inclined in parallel spaced relationship with said housing bearing surfaces for equal support of said casing in the axial and radial planes thereof; and
 (d) a source of pressurized gas disposed for flow between said housing and casing bearing surfaces for substantially frictionless support of said casing.

2. A gyroscopic assembly as in claim 1 wherein:
 (a) said housing bearing surfaces are provided with apertures disposed in normal relation thereto;
 (b) a manifold disposed in said housing in communication with said apertures; and
 (c) means for supplying pressurized gas to said manifold and bearing surfaces for substantially frictionless support of said casing in said housing.

3. A gyroscopic assembly as in claim 2 wherein said manifold includes a pair of continuous passageways extending intermediate the housing wall and said bearing surfaces for communication with said source of pressurized air.

4. A gyroscopic assembly as in claim 2, in which said gas is air.

5. A gyroscopic assembly as in claim 3 in which said casing is hermetically sealed.

6. A gyroscopic assembly as in claim 5 provided with a device mounted on said housing for detecting movement of said casing from a null position.

7. A gyroscopic assembly as in claim 6 wherein said device is an inductive pick up mechanism.

8. A gyroscopic assembly as in claim 7 including a torquer mechanism mounted on said housing and disposed for actuation by said pick up device for returning said casing to said null position.

9. A gyroscopic assembly comprising:
 (a) a cylindrical housing;
 (b) a casing having a gyro rotor mounted therein, said casing provided with a central annular portion and a pair of bearing surfaces disposed on opposite sides of said annular portion at a 45 degree angle therewith;
 (c) bearing surfaces disposed in said housing in parallel spaced relation with said casing bearing surfaces to form a cavity between said bearing surfaces;
 (d) a plurality of orifices disposed in normal relation with said housing bearing surfaces for communication with said cavity;
 (e) a pair of continuous passageways provided in said housing in communication with said orifices; and
 (f) an air manifold connected to a source of pressurized air and said passageways for flow of air into said cavity for substantially frictionless support of said casing.

10. A gyroscopic assembly comprising:
 (a) a cylindrical housing having a plurality of bearing surfaces disposed annularly therein at a 45° angle with the longitudinal axis of said housing;
 (b) a casing having a rotor mounted therein for rotation about a first axis, said casing disposed for movement about a second axis and provided with a pair of spaced, parallel circular surfaces, a central annularly disposed flat surface and a pair of outer annular surfaces each inclined at a 45° angle with said central surface and each of said circular surfaces, each of said inclined surfaces extending from opposite sides of said central surface to respective ones of said circular surfaces and being spaced from and forming a bearing surface with said bearing surfaces of said housing;
 (c) a source of pressurized gas disposed for flow between said inclined bearing surfaces of said casing and said housing for substantially frictionless support of said casing in said housing; and,
 (d) means for detecting movement of said casing about said second axis.

References Cited by the Examiner
UNITED STATES PATENTS

| | | | |
|---|---|---|---|
| 2,617,695 | 11/1952 | Tauscher et al. | 74—5 X |
| 2,925,736 | 2/1960 | Mueller | 74—5.6 |
| 2,926,530 | 3/1960 | Mueller et al. | 74—5 X |
| 2,945,643 | 7/1960 | Slater | 74—5 X |
| 2,969,680 | 1/1961 | Linn et al. | 74—5 |

MILTON KAUFMAN, *Primary Examiner.*

T. W. SHEAR, *Assistant Examiner.*